Patented May 26, 1925.

UNITED STATES PATENT OFFICE.

FRANK EDWARD ELMORE, OF BOXMOOR, ENGLAND, ASSIGNOR TO NIELS C. CHRISTENSEN, OF SALT LAKE CITY, UTAH.

TREATMENT OF ARGENTIFEROUS SULPHIDE ORES.

No Drawing.  Application filed February 5, 1920.  Serial No. 356,391.

*To all whom it may concern:*

Be it known that I, FRANK EDWARD ELMORE, a subject of the King of Great Britain, residing in Boxmoor, England, have invented certain new and useful Improvements in the Treatment of Argentiferous Sulphide Ores, of which the following is a specification.

This invention relates to improvements in the treatment of argentiferous sulphide ores, concentrates and the like (hereinafter called "ores") for the separation and recovery of the silver and other metals contained therein.

In British patent specification No. 127,641 I have described a process (hereinafter called "the acid brine process") for the separation of lead and zinc from ores in which these metals co-exist in the form of sulphides, the said process consisting in treating the finely divided ore with a hot strong solution of sodium chloride to which a sufficient quantity of sulphuric or hydrochloric acid or an alkali bisulphate is added, whereby the lead is caused to pass into solution whilst substantially the whole of the zinc sulphide remains undissolved, the hot solution obtained being separated from the residue containing the undissolved zinc sulphide and cooled to cause a partial crystallization of the lead salt.

Ores suitable for treatment by the aforesaid process frequently contain appreciable proportions of silver, the efficient recovery of which by hitherto known methods of extraction is attended with difficulties. On treatment of the ore with acid brine only a portion of the silver passes into solution along with the lead. This portion may be recovered by known methods, but the balance remains undissolved with the zinc sulphide in the residue. The object of the present invention is to provide a satisfactory method of separating and recovering in form suitable for metallurgical treatment substantially the whole of the silver and also, if desired, the lead and zinc contained in such ores. In certain cases the ore may be poor in lead and zinc and yet rich enough in silver to be worth treatment for the recovery of this metal alone.

According to this invention, if the argentiferous ore or the argentiferous residue containing zinc sulphide obtained therefrom by the acid brine process (which residue is hereinafter intended by the words "argentiferous residue") is heated under such conditions that the zinc sulphide remains substantially unchanged, the silver compounds which it contains become soluble in the solvent. Thus there is the technical advantage that the silver recovery may be enhanced without defeating the object of the treatment with the solvent, namely the separation of the lead sulphide from the zinc sulphide wihout substantial alteration of the latter. The increased solubility of the silver compounds is brought about whether the ore itself is heated or the zinc sulphide residue which is left after extracting the lead is heated. In the former case it is of no importance if the lead sulphide suffer oxidation, it is only essential that the zinc sulphide should remain substantially unaffected.

Therefore, according to this invention the ore itself, or the argentiferous residue containing zinc sulphide obtained, is subjected to a suitable heat treatment as hereinafter described, and the silver and lead are then extracted by means of suitable solvents which leave the zinc sulphide substantially undissolved. In some cases the ore after heat-treatment is subjected to the acid brine process and the argentiferous zinc-sulphide residue obtained is then without further heat-treatment leached by means of the said solvents. The silver passing into solution is recovered by known methods; the lead may also be recovered by known methods and the desilverized zinc sulphide may be subjected to metallurgical treatment as desired.

The suitable solvents aforesaid consist of hot, strong solutions of sodium chloride, calcium chloride or magnesium chloride containing relatively small proportions of acid chloride. By the term "acid chloride" as hereinafter used and in the claims appended hereto I intend to include hydrogen chloride, a metallic chloride of an acid nature, and such metallic chloride associated with hydrogen chloride. I prefer to use a saturated solution of sodium chloride or a solution containing approximately 35 per cent by weight of calcium chloride or magnesium chloride, to which has been added a small percentage (varying with the composition of the material to be leached) of cupric chloride, hydrochloric acid, or both. In cases where the ore after heat-treatment is not subjected to the acid-brine process, I prefer to use a solvent containing about 35 per cent of calcium or magnesium chloride and a quantity of hydrochloric acid not greatly in excess of that required to convert into lead chloride the lead in the material to be leached, after allowing for other acid-consuming constituents, if any, present in the ore. The formation of zinc chloride is thus reduced to a minimum, whilst satisfactory extractions of the silver and lead are effected.

The suitable heat treatment aforesaid consists, according to one form of the invention, in heating the ore or the argentiferous residue to about a dull red heat (a temperature of about 500° to 600° C. being commonly suitable) in a closed or open vessel or in an atmosphere of neutral or reducing gas for a short period, for example about 1 hour. This treatment greatly enhances the extractability of the silver by the solvents aforesaid. Its effect does not appear to be dependent upon the oxidation of any of the sulphides of lead or zinc; satisfactory results have been obtained by the preferred method of heating the ore or argentiferous residue alone in a closed vessel, as well as by heating it in an open vessel, although in the latter case much of the lead sulphide and a relatively small portion of the zinc sulphide may become oxidized. The heating of the ore has also been carried out in presence of carbon dioxide, carbon monoxide, hydrogen and nitrogen, with satisfactory results, but I prefer the method of heating in a closed vessel.

The following are examples of the manner in which the invention may be performed.

*Example A.*—An argentiferous lead-zinc sulphide ore from Burmah is treated with hot strong brine and sulphuric acid in the manner indicated in Example 2 of my aforesaid British specification No. 127,641. There are thus obtained, on the one hand, an undissolved residue containing zinc sulphide and a portion of the silver and, on the other, a hot solution containing the lead and the balance of the silver. The silver in the solution may be recovered by known methods; as the brine is in practice used repeatedly I prefer to cool the solution, collect the deposited lead salts and treat the latter to concentrate and recover in the form of argentiferous lead sulphate the silver which they contain, as described in the British specification No. 129,773. The argentiferous zinc sulphide residue, after draining, washing and drying, is heated in a closed vessel to a dull red heat (about 600° C.) for about 1 hour, and is allowed to cool. It is then treated with a solvent consisting of a hot, strong solution of calcium chloride containing about 35 per cent of $CaCl_2$ and about 5 per cent of cupric chloride, whereby substantially all the silver is extracted from the residue. Thus a residue containing 18.6 ounces of silver per ton was leached for about 1 hour at 90° C. with the acid solvent in the proportion of 1 gallon of liquid per pound of residue, 88 per cent of the silver being extracted. A similar residue, containing 23 ounces of silver per ton, when leached in the same maner with a solution containing 35 per cent of calcium chloride, 5 per cent of cupric chloride and 3 per cent of commercial concentrated hydrochloric acid, yielded 90 per cent of the silver to the solvent.

*Example B.*—An ore of the kind referred to in Example A is heated in a closed pot to 650° C. for 1 hour. After cooling and, if necessary, grinding, it is treated by the acid brine process as indicated in the foregoing example for separation of the lead and zinc, the silver accompanying the lead salts being afterwards recovered as therein stated. The argentiferous residue containing zinc sulphide is then treated with a hot solvent such as described in Example A for extraction of the silver; thus a residue containing 8.25 ounces of silver per ton, when leached with the calcium chloride-cupric chloride solvent, yielded 94 per cent of the silver to the latter. In another example an ore containing 21.9 ounces of silver per ton was heated to 450° C. for 45 minutes and then treated by the acid brine process; the residue was leached at 95°–100° C. for half an hour with a solution containing 35 per cent of calcium chloride and about 5 per cent of commercial concentrated hydrochloric acid; and the final zinciferous residue was found to contain less than 5 per cent of the silver originally present in the ore.

*Example C.*—The ore, after being heated in a closed pot, is leached with a solvent which extracts practically the whole of the lead and silver together, leaving practically all the zinc sulphide undissolved. The treatment of the heated ore by the acid brine process, as in Example B, is thus dispensed with. In this case the solvent consists of a hot, strong, acid solution containing about 35 per cent of calcium or magnesium chloride and a quantity of hydrochloric acid not greatly in excess of that required to ensure the extraction of the silver and lead present. Thus an ore from Burmah containing 16.5 per cent of lead, 40.3 per cent of zinc and 18.5 ounces of silver per ton was heated in a closed pot to 700° C. for 1 hour and was then leached for 30 minutes at about 95° C. with the said solvent in the proportion of 1344 gallons of a 35 per cent solution of calcium chloride and 90 gallons of commercial concentrated hydrochloric acid per ton of ore. The residue contained 52.5 per cent of zinc and only a trace of lead; 94 per cent of the silver passed into the solvent.

Whatever be the explanation of the effect of the heat-treatment, it has been found that if the treatment be omitted a relatively small proportion of the silver is extracted by means of the solvents hereinbefore referred to.

The fineness to which the ore should be crushed, the temperature and duration of the heat treatment required, and the strength and quantity of the solutions used vary to some extent with the nature of the ore and other circumstances, but may readily be ascertained beforehand by trial on a laboratory scale. In some cases it may be advisable to subject the ore to a preliminary concentration with the object of reducing the proportion of acid-consuming or other objectionable material therein.

Having thus described the nature of the said invention and the best means I know of carrying the same into practical effect, I claim:—

1. Process for treating argentiferous lead-zinc sulphide ores or argentiferous residue consisting in heating the material to about a dull red heat under conditions which as regards the zinc sulphide are substantially non-oxidizing whereby the zinc sulphide remains substantially undecomposed and then extracting the silver and lead by means of solvents which leave the zinc sulphide substantially undissolved.

2. Process of treating argentiferous lead-zinc sulphide ores or argentiferous residue, consisting in heating the material to about a dull red heat under conditions which as regards the zinc sulphide are substantially non-oxidizing whereby the zinc sulphide remains substantially undecomposed and then extracting the silver and lead by means of a solution of alkaline-earth chloride containing acid chloride which leaves the zinc-sulphide substantially undissolved.

3. Process of treating argentiferous lead-zinc sulphide ores or argentiferous residue, consisting in heating the material to about a dull red heat under conditions which as regards the zinc sulphide are substantially non-oxidizing whereby the zinc sulphide remains substantially undecomposed and then extracting the silver and lead by means of a solution of alkaline-earth chloride containing hydrogen chloride which leaves the zinc sulphide substantially undissolved.

4. Process of treating argentiferous lead-zinc sulphide ores, consisting in heating the ore to about a dull red heat under conditions which as regards the zinc sulphide are substantially non-oxidizing whereby the zinc sulphide remains substantially undecomposed and then leaching the ore which has been thus heated with a hot solution containing about 35 per cent of alkaline earth chloride and a quantity of hydrochloric acid not greatly in excess of that required to convert the lead sulphide into chloride, whereby the silver and lead are extracted together and the zinc sulphide is left substantially undissolved.

In testimony whereof I have signed my name to this specification.

FRANK EDWARD ELMORE.